United States Patent [19]
Brent et al.

[11] Patent Number: 5,586,402
[45] Date of Patent: Dec. 24, 1996

[54] FISHING ROD BITE INDICATOR

[76] Inventors: S. Shannon Brent; Craig W. Forbes, both of 1050 Sunnyview Rd. NE., Salem, Oreg. 97303

[21] Appl. No.: 395,490

[22] Filed: Feb. 27, 1995

[51] Int. Cl.⁶ ................................................. A01K 97/12
[52] U.S. Cl. .................................................... 43/17
[58] Field of Search ........................ 43/17, 25, 17.5, 43/16

[56] References Cited

U.S. PATENT DOCUMENTS

| | | | |
|---|---|---|---|
| 3,680,244 | 8/1972 | Cala | 43/17 |
| 3,878,635 | 4/1975 | Trosper et al. | 43/17 |
| 4,541,195 | 9/1985 | Delaney | 43/17 |
| 4,633,608 | 1/1987 | Savarino | 43/17 |
| 5,396,726 | 3/1995 | Zepeda | 43/17 |

*Primary Examiner*—Joseph J. Hail, III
*Assistant Examiner*—I.-H. Lin

[57] ABSTRACT

An invention for use by an angler, while fishing, to indicate when a fish is either caught on the hook, or is nibbling on the bait. The invention utilizes a detachable clamping mechanism which may be affixed at selected locations along the length of the fishing rod. A visual indicator rod (12) is housed within a slide tube (8) which conceals approximately one half of the indicator rod. The fishing line is passed through a spiral line guide (14). An adjusting clip (6) provides the proper alignment of the visual indicator rod (12). Once the proper alignment is achieved, the angler casts to the desired location and places the fishing rod in a support. A small amount of slack is then introduced into the fishing line. When a fish tugs on the line the slack is thereby removed causing the visual indicator rod (12) to be elevated thereby exposing the brightly colored portion of the rod previously concealed by slide tube (8). This alerts the angler to the bite. The angler may then set the hook and retrieve the fish.

5 Claims, 3 Drawing Sheets

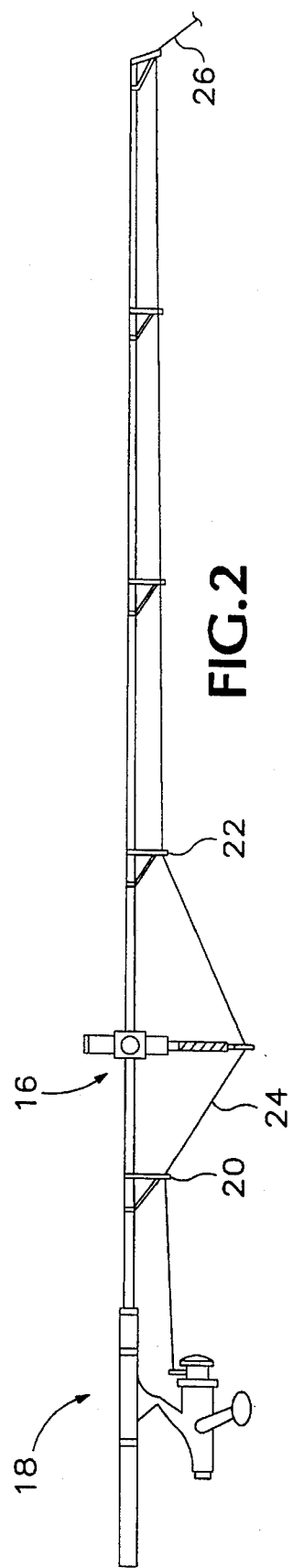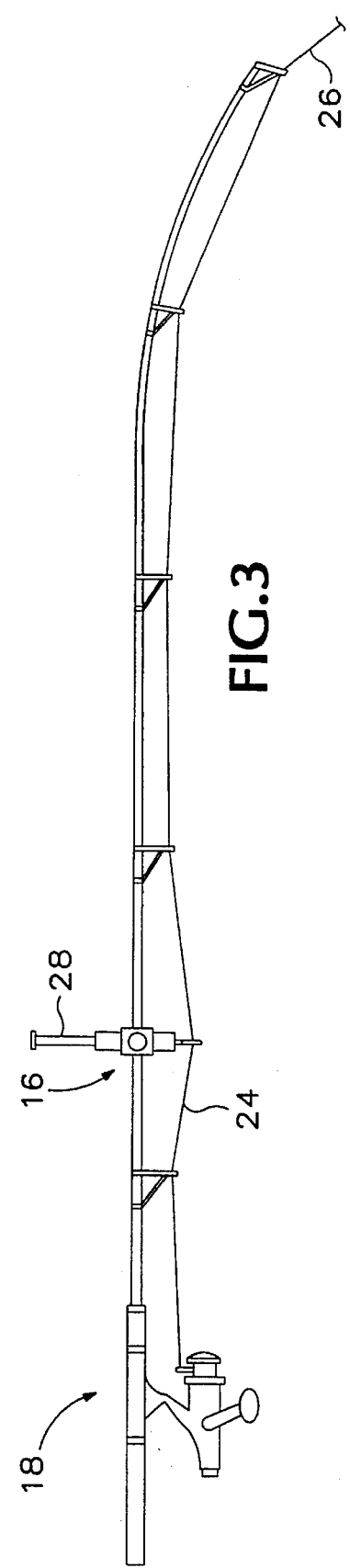

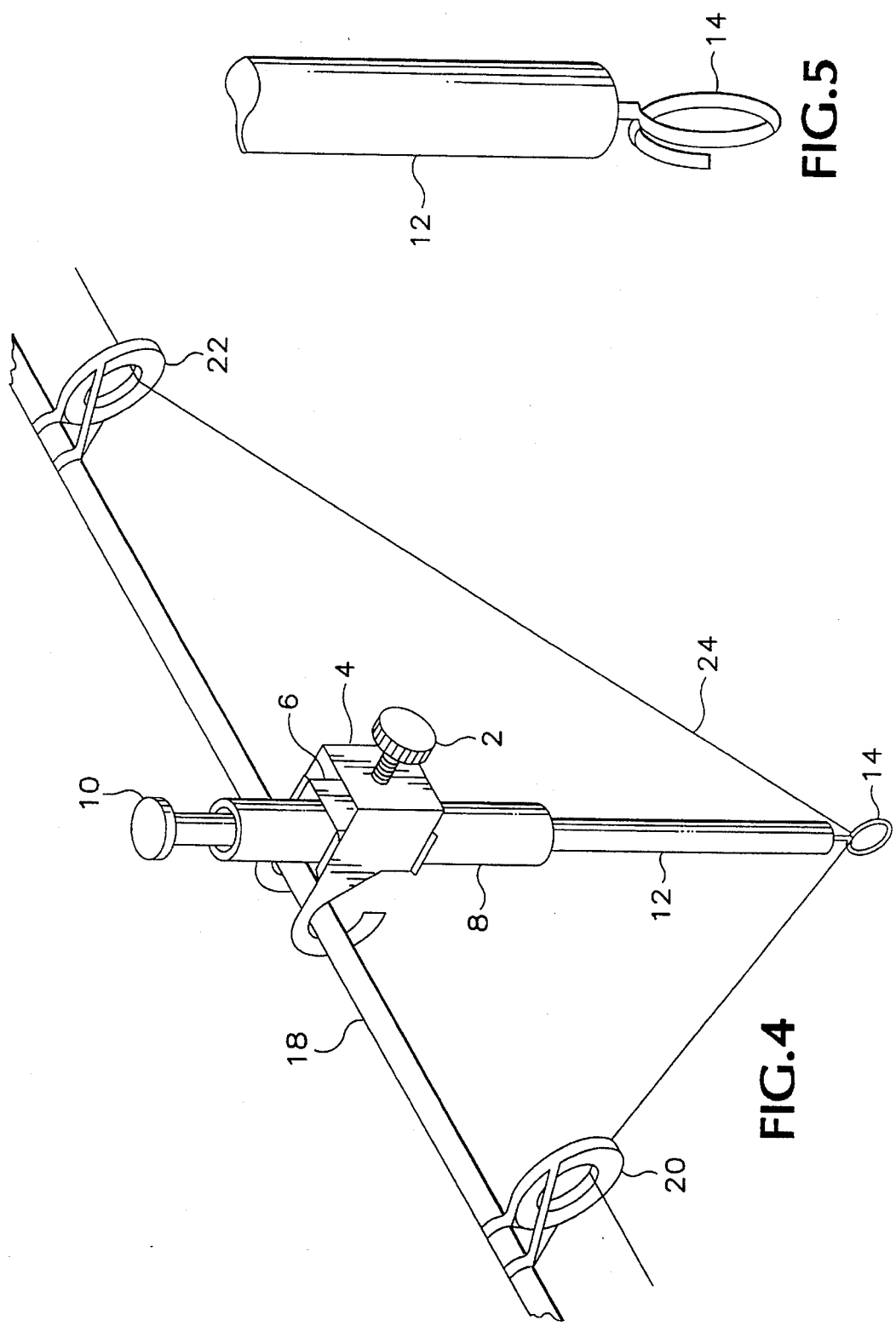

FISHING ROD BITE INDICATOR

BACKGROUND

1. Field of the Invention

This invention relates to fishing equipment and more particularly with a visual means by which the angler can detect bites or strikes to the baited hook attached to the fishing line.

2. Description of Prior Art

It has long been recognized that detecting bites or strikes to the baited hook will aid the angler in catching more fish. Accordingly, it has been the objective of prior art to provide such bite detection. In prior art there have been many and varied approaches to accomplishing this objective. Most have several, if not many, disadvantages or short-comings. These disadvantages include size, weight, complexity, awkwardness, cost, and a general failure of the device to perform as desired.

In U.S. Pat. No. 3,962,812 issued to Means et al (1976) a balance beam arrangement has been employed. A major drawback of this device is that the fishing rod must be modified in order to employ the adapter used to attach it to the fishing rod. Such modification is destructive to a portion of the fishing rod and renders said fishing rod useless in other fishing situations. Furthermore, casting cannot be accomplished with this device in place.

In U.S. Pat. No. 4,380,883 issued to Greaux (1983) the disclosed invention use a bell as a means of signaling the bite or strike. This arrangement has several drawbacks. The first and foremost deals with sound transmission. It is a known law of physics that sound transmission is many times greater in water than in air. As a fish tugs on the bait the fishing line is caused to become taut thereby causing the bell to ring. As such sound is transmitted through the air it is simultaneously transmitted down the fishing line into the water. Such unnatural sounds and vibrations perceived by the fish, which may not as yet be hooked, frequently causes said fish to become spooked and vacate the vicinity.

Yet another drawback of this device lies in the fact that the angler must hear the bell ringing to become alerted to the bites. Since the bell used in this invention is quite small there is the potential that the angler will not hear the bell over the background noise in many fishing situations.

In U.S. Pat. No. 5,115,590 issued to Larson (1992) disclosed is a device designed to be used on an rigid, ice fishing rod. This device employs still another version of the balance beam arrangement. There are two main drawbacks associated with this particular invention. First, it is designed to be used solely on a rigid, ice fishing rod. It is not designed to be used on a conventional, flexible fishing rod. Second, this device is very sensitive. While sensitivity in itself is not a negative feature, considering the basic design of this invention, it has the effect of being somewhat difficult to set. Given just a little wind or surface disturbance on the water and the angler could become quite frustrated in his attempts to properly adjust this device.

The invention disclosed in U.S. Pat. No. 5,077,928 issued to Deskevich (1992) employs a small body of material which resembles a bead or small section of tube through which the fishing line is passed. This arrangement discloses an improvement over much of the prior art. However, the invention relies upon observing movement of said body of material, while suspended from the fishing line, for bite indications. Since there is no datum or point of reference, small movements or changes in position can go undetected. A further drawback of this invention is that the fishing line must be passed through the device in order to utilize it. If the angler wishes to it to employ the device on a different rod, the rod must be unstrung in order to remove it. This would require the angler to remove all terminal tackle first. This can be a time consuming and undesirable feature of this invention.

Similarly, U.S. Pat. No. 4,038,772 issued to Mihály et al (1977) employs a pivoting tube through which the fishing line must be passed. In this case, however, the tube is of much greater size and appears to be somewhat obtrusive. Furthermore, the same drawback, for detecting movement of the device, is present in this invention as noted in U.S. Pat. No. 5,077,928 issued to Deskevich (1992). Another drawback of this invention contemplates a permanent attachment to the fishing rod. Still another drawback of this invention contemplates the angler making mental calculations with respect to angular momentum and mass verses inertia.

In U.S. Pat. No. 4,146,988 issued to Bednarczyk (1979) disclosed is a variation of the balance beam arrangement. This device uses a pivotal arm to indicate a bite. This is merely an improvement over prior art utilizing previously known tip-up technology. The device is designed to be attached to the fishing rod at the handle. It appears that this device is designed to be used on a fishing rod using a spinning reel only. It does not appear to be useful on other types of fishing rods, such as bait casting or closed face spin cast reels.

Casting, when using a spinning reel, is accomplished by gripping the fishing rod handle with the second and third fingers straddling the reel-mount support arm with the index finger retaining the fishing line. Considering this arrangement, this device can be seen to create something of a nuisance during casting and retrieving.

Another drawback of this invention is that the location of the device during normal usage, that is, attached to the fishing rod handle. After casting, the fishing rod is typically placed in a rod holder or support. Many of such rod holders would preclude the usage of this device since they are tubular in design. This type of rod holder is used by sliding the fishing rod handle into a tube attached to a sand spike or other such arrangement. Clearly this would confine the tip-up flag of this device preventing it from functioning.

Finally, we come to a device disclosed in U.S. Pat. No. 4,766,688 issued to Hiles (1988). In this device electronics are employed to detect and signal a bite. There are a number of drawbacks associated with using electronics in bite indicators.

The first, of course, is the fact that electronic devices can fail due to moisture, condensation, corrosion, and the natural degradation of its components. Second, the means for detection of bites involves either lights or audible alarms. Lights are virtually useless during normal daylight hours since the ambient light would likely overwhelm such indications. Lights are useful for night fishing, however.

Audible alarms, as previously mentioned, transmit the waves of unnatural sounds down the taut fishing line into the water thereby frightening the fish. Also, as previously mentioned, audible alarms can go undetected since background noise in many fishing locations could muffle the sound.

Another drawback of using electronic is the relatively higher cost in manufacturing and therefore, in the cost to the consumer. Finally, this device relies upon a very critical angle to insure proper operation. A mercury switch is mounted on a circuit board at a 45 degree angle to compensate for an anticipated angle at which the fishing rod will be placed to rest after casting. Misjudging this angle, even by a small degree, can affect the operation and sensitivity of the device, thereby limiting its effectiveness. Furthermore, mercury is highly toxic and is undesirable in proximity of reservoirs used for drinking water supplies.

OBJECTS AND ADVANTAGES

While there are many strike indicators disclosed in prior art, our invention uses a revolutionary approach with a great many advantages. Several of the objects and advantages of the present invention are:

(a) to provide a fish bite indicator that is easy to attach and remove from a conventional, flexible fishing rod;

(b) to provide a fish bite indicator which will not interfere with, nor require removal or adjustments during casting or retrieving;

(c) to provide a fish bite indicator which alerts the angler without alerting or scaring the fish;

(d) to provide the angler with such bite indications without the use of electronics and devoid their aforementioned drawbacks;

(e) to provide the angler with bite indications while reducing eyestrain.

(f) to provide the angler with a visual means of detecting bites while fishing at any depth of water.

(g) to allow the angler to use a clear, water-filled bobber on the water to control the depth at which the bait is presented yet provide bite indications at the fishing rod.

Further objects and advantages are to provide a simple to use, inexpensive bite indicator that is extremely sensitive to bites while being simple to set. Still further objects and advantages will become apparent from a consideration of the ensuing description and drawings.

DRAWING FIGURES

FIG. 2 shows the invention in the preferred positioned and attached to a conventional, flexible fishing rod in the ready or set mode.

FIG. 3 shows the invention in the strike mode indicating a fish is tugging on the fishing line at the hook.

FIG. 4 is an enlarged, close-up detail of the invention showing the preferred means of attachment to the fishing rod.

FIG. 5 show an enlarged detail of the preferred means of attaching the fishing line to a invention.

Figure 1:
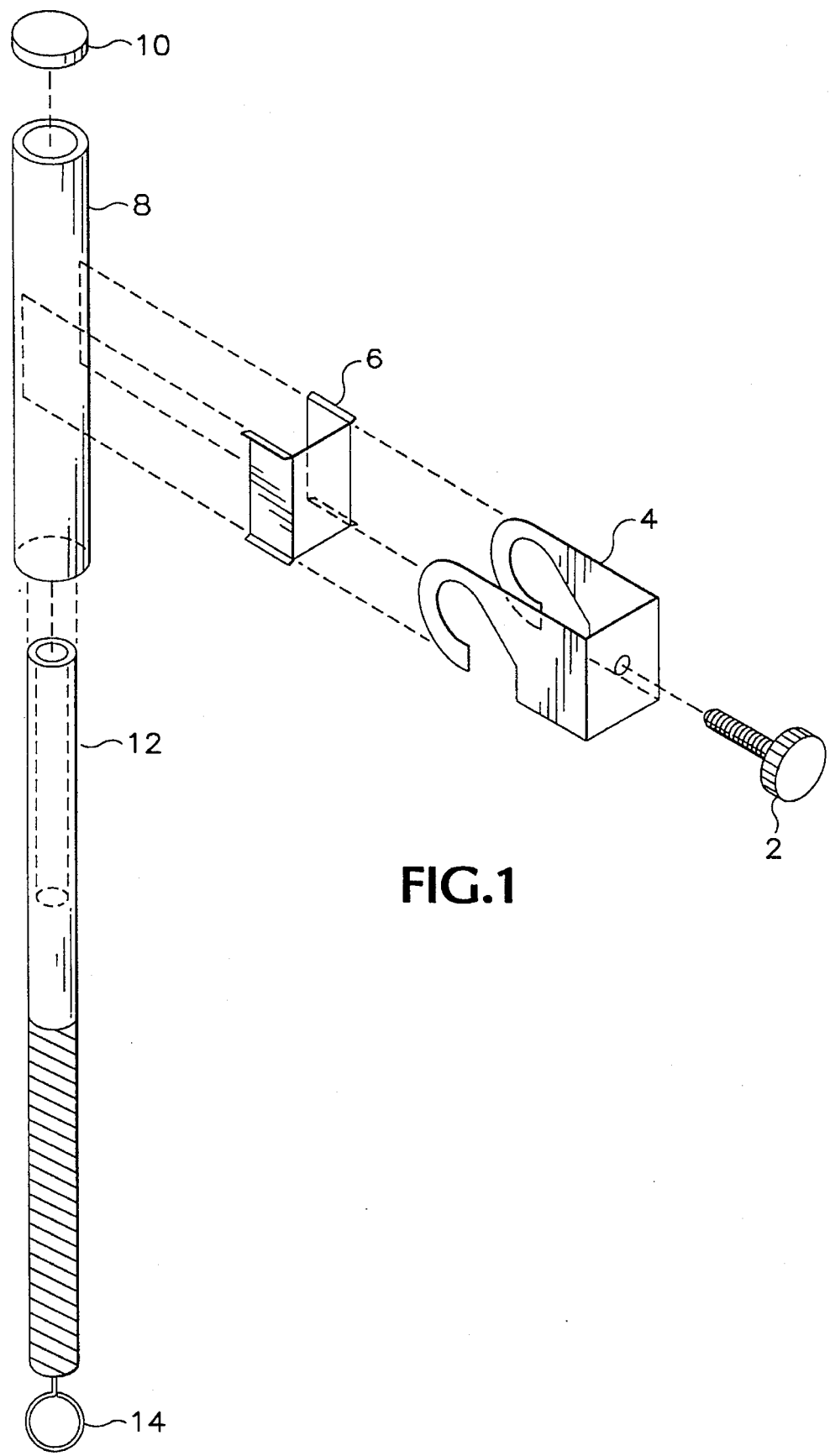
FIG. 1 shows the invention in an exploded view.

| Reference Numerals in Drawings | |
| --- | --- |
| 2 set screw | 4 rod clamp |
| 6 adjusting clip | 8 slide tube |
| 10 visual indicator rod cap | 12 visual indicator rod |
| 14 spiral line guide | 16 the invention attached to the fishing rod |
| 18 fishing rod and reel | 20 stripper line guide |
| 22 feeder line guide | 24 fishing line |
| 26 fishing line to water | |

DESCRIPTION OF FIGS 1–5

FIG. 1 is an exploded view of the preferred embodiment of the present invention. Shown is a set screw (2) and rod clamp (4) into which the set screw is inserted and can be rotated in a clockwise direction so as to affix the invention to a fishing rod (not shown here). In the preferred embodiment the material for rod clamp (4) is any of several rigid, highly durable materials, such as anodized aluminum, which are unaffected by the weather or water. The preferred embodiment reveals rod clamp (4) as a notched clevis or "U" shaped hook designed to be placed over the fishing rod (not shown here) and used as a means of attaching the invention thereto. The preferred embodiment of rod clamp (4) having two hooks with a radius large enough to fit over most fishing rods at the intended point of attachment. Additionally, in the preferred embodiment visual indicator rod (12) is depicted with a black or dark colored lower portion and a brightly colored upper portion is shown. The present invention anticipates a separate visual indicator rod cap, however, other embodiments might employ a visual indicator rod with a cap built-in. Another embodiment might employ a visual indicator rod that is both clear and hollow with a detachable cap to allow the insertion of any of several chemical light sticks or pellets. Such an embodiment would allow for the invention to be used at night. In the preferred embodiment the material of choice for visual indicator rod (12) is any of several types of plastics, however, other materials can be used. Also shown is adjusting clip (6) which is used to achieve correct alignment of slide tube (8) and spiral line guide (14) with the line guides of the fishing rod. The preferred material for said adjusting clip (6) would be the same material used to fabricate rod clamp (4). Also shown is a slide tube (8) which serves several functions. One function is to provide the visual indicator rod (12) with the means to freely travel to its limits. The travel of the visual indicator rod (12) through slide tube (8) is limited by the visual indicator rod cap (10) at one end and a spiral line guide (14) at the other. During the manufacturing process, visual indicator rod (12) will be installed into slide tube (8). Next, visual rod cap (10) can be permanently or semipermanently affixed to the top of indicator rod (12) by gluing, screwing, welding, or pressure fitted. Then spiral line guide (14) can be installed into the bottom of visual indicator rod (12). This effectively creates an assembly which will allow the visual indicator rod (12) to slide from one end of the slide tube 8 to the other without separating therefrom.

FIG. 2 shows the preferred embodiment of the present invention (16) attached to a conventional, flexible fishing rod (18). Also shown is stripper line guide (20) of said fishing rod and feeder line guide (22) of said fishing rod. Additionally, fishing line (24) is shown to be slack with the present invention in the set condition. Fishing line (26) is shown beyond the last line guide of said fishing rod.

FIG. 3 shows that which is shown in FIG. 2 except that fishing line (24) is shown taut with the present invention depicted in the strike condition as evidenced by visual indicator rod (28) fully elevated revealing the brightly colored upper portion thereof, indicating a fish pulling on fishing line (26). Also shown is said fishing rod (18) in a bent or flexed condition further characterizing the taut condition of said fishing line (24) and offering further proof a fish pulling on said fishing line (26).

FIG. 4 shows the preferred embodiment of the present invention detailing the preferred means of attachment to a conventional fishing rod (18). The present invention is shown mounted between stripper line guide (20) and feeder line guide (22). Additionally, the relationship of the various components of the present invention to said fishing rod (18) are shown. The components shown are set screw (2) threaded into rod clamp (4) with adjusting clip (6) fitted over slide tube (8) and inserted between two side elements of rod clamp (4). Also shown is fishing line (24) passed through spiral line guide (14).

FIG. 5 is an enlarged detail of the lower portion of said visual indicator rod (12) showing the configuration of spiral line guide (14).

OPERATION OF FIGS. 1–5

The present invention is designed to be both easy to attach and easy to use. Only one adjustment is required prior to mounting the invention. First, the fishing rod onto which the invention is to be attached should be strung and the fishing line made taut. This can be accomplished by installing any of several types of terminal tackle beyond the last line guide of said fishing rod. The terminal device selected should be one of such size as will not pass through the last line guide of the fishing rod. Then cranking the reel handle until the terminal device comes to rest against the last line guide of the fishing rod causing the fishing line to become taut. Next, the adjusting clip is separated from the slide tube. This is accomplished by gripping the clip with one hand and the slide tube in the other hand and pulling to separate. This does not require much force. Next, the slide tube assembly (slide tube (8) with visual indicator rod (12), visual indicator rod cap (10), and spiral line guide (14) installed during manufacture) is held with the visual indicator rod (12) in the fully elevated position. The assembly is then held perpendicularly against the fishing rod, to which the invention is to be attached, preferably at a mid-point between the stripper line guide and the next feeder line guide. The assembly is then moved perpendicular to the fishing rod (up or down when the fishing rod is held horizontally) until spiral line guide (14) is brought into alignment with the taut fishing line as depicted in FIG. 3. Adjusting clip (6) is then pressed onto the slide tube (8) at the point where slide tube (8) intersects the fishing rod. The slide tube assembly with the adjusting clip attached can now be mated with rod clamp (4) by sliding the clip (with the assembly attached) between the two hooks of rod clamp (4) as depicted in FIG. 4. The entire assembly is then mated to the fishing rod by slipping the hooks of rod clamp (4) over the fishing rod also depicted in FIG. 4. Set screw (2) is then tightened until there is firm contact between slide tube (8) and the fishing rod. This will secure the invention in place for use. Finally, the fishing line is slipped into spiral line guide (14). FIG. 5 shows that spiral line guide is not a closed line guide but rather an open spiral loop wherein the fishing line can be easily be inserted. The invention is now ready for use. Simply bait the hook and cast it to the desired location. The invention does not required any special attention or further adjustments in order to cast or retrieve. Since the visual indicator rod (12) is permitted to freely slide within slide tube (8), any tension on the fishing line will cause it to become elevated and thereby aligned with the stripper line guide and the feeder line guide. This permits the free travel of the fishing line to the intended casting point. The same is also true for retrieving.

The fishing rod is then placed into a rod holder or support device. After the fishing rod is placed in the rod holder or support a little slack is introduced into the fishing line as shown in FIG. 2. This allows the visual indicator rod to descend into the slide tube concealing the brightly colored upper portion. The angler may then relax and wait for a bite. Any bites or nibbles will be detected by the invention and will be evidenced by the elevation of the visual indicator rod which is brightly colored. It will be easily seen since it is attached to the fishing rod.

SUMMARY, RAMIFICATIONS, AND SCOPE

By now, the reader should be aware that the present invention is both simple to install and use. Furthermore, our invention holds many advantages over prior art in this field.

The fishing rod bite indicator can be attached or removed in seconds. It does not require frequent or tedious adjustments. It can be used on virtually any type of fishing rod, such as spinning rods, spin casting rods, or bait casting rods. The visual indicator rod moves freely in the slide tube and is self-aligning, therefore, it does not interfere with casting or retrieving.

The present invention allows the angler to fish in any depth of water without the need to constantly watch a floating bobber or the fishing rod tip.

Other possible embodiments of the present invention could allow for night fishing. The fishing rod bite indicator is extremely sensitive but such sensitivity is a positive attribute rather than a negative one as note in my discussion of U.S. Pat. No. 5,115,590 issued to Larson (1992). Since the present invention does not rely on a critically balanced beam to be "set" it will not frustrate the angler but rather will aid him in detecting bites heretofore having gone unnoticed.

Although the above description contains numerous specifications, these should not be construed as limiting the scope of the invention but as merely providing illustrations of some of the presently preferred embodiments of this invention. For example, the visual indicator rod could be made with the cap built-in or in some other configuration. One such configuration could allow for the use of a chemical light stick for night fishing. Another example, might be in the choice of materials used in manufacturing of the rod clamp and slide tube clip.

Thus, the scope of the invention should be determined by the appended claims and their legal equivalents, rather than by the examples given.

Having described our invention we claim:

1. A fish bite indicator for use on a fishing rod comprising the combination of:
   (a) a clamping member comprised of two rigid, parallel arms containing generally hook-shaped openings at the opposite end of an integral perpendicular member having a generally centered threaded hole with a set screw thereby providing the means of attachment of the visual indicator assembly to the fishing rod,
   (b) a rigid, channel-shaped member having aligning flanges on the upper and lower edges of the parallel arms which loosely fits inside the parallel arms of the clamping member,
   (c) a rigid, tubular member positioned snugly inside the parallel arms of the channel-shaped member,
   (d) a rigid, elongated tubular member of approximately twice the length and possessing an exterior dimension slightly less than the interior dimension of the tubular member into which it is inserted; having at its lowermost end a spiral line guide providing the means to encompass fishing line and at its uppermost end a perpendicular projection forming a cap of a size wherein its outermost dimension is slightly larger than the interior dimension of the tubular member providing the means to limit the travel of the elongated tubular assembly within the tubular member and forming, as an assembly, a line-tension-responsive indicating means being operable to produce a visual indication when the action of a fish produces enough line tension to raise the elongated member assembly inside the tubular member when said member is attached in a perpendicular, vertical position on the fishing rod.

2. The fish bite indicator of claim 1 wherein the uppermost half of said elongated member is brightly colored and the remaining portion is colored darkly.

3. The fish bite indicator of claim 1 wherein said tubular member is constructed of a darkly colored material.

4. The fish bite indicator of claim 1 wherein the rigid, channel-shaped member provides the means to constrain said tubular member and adjust the spacial relationship between said tubular member and the fishing rod.

5. The fish bite indicator of claim 1 wherein the uppermost portion of said elongated member assembly is transparent and having a chamber therein for a light-producing chemical substance to be inserted thereby providing the means for visual indications at night of a fish applying tension to the fishing line causing the elongated member assembly to be raised.

* * * * *